(12) United States Patent
Jiang et al.

(10) Patent No.: US 11,621,753 B2
(45) Date of Patent: Apr. 4, 2023

(54) MULTI-AP COORDINATED BEAMFORMING (CBF) FOR EXTREMELY HIGH THROUGHPUT (EHT)

(71) Applicant: Intel Corporation, Santa Clara, CA (US)

(72) Inventors: Feng Jiang, Santa Clara, CA (US); Qinghua Li, San Ramon, CA (US); Xiaogang Chen, Portland, OR (US); Po-Kai Huang, San Jose, CA (US); Arik Klein, Givaat Shmuel (IL); Dmitry Akhmetov, Nizhny Novgorod (RU); Carlos Cordeiro, Portland, OR (US); Chittabrata Ghosh, Fremont, CA (US); Ziv Avital, Kadima (IL); Dibakar Das, Hilsboro, OR (US); Cheng Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 247 days.

(21) Appl. No.: 15/930,885

(22) Filed: May 13, 2020

(65) Prior Publication Data

US 2020/0274588 A1    Aug. 27, 2020

Related U.S. Application Data

(60) Provisional application No. 62/847,215, filed on May 13, 2019, provisional application No. 62/866,112, filed on Jun. 25, 2019, provisional application No. 62/895,883, filed on Sep. 4, 2019.

(51) Int. Cl.
*H04B 7/06* (2006.01)
*H04W 84/12* (2009.01)

(52) U.S. Cl.
CPC ......... *H04B 7/0617* (2013.01); *H04B 7/0626* (2013.01); *H04W 84/12* (2013.01)

(58) Field of Classification Search
CPC .... H04B 7/0617; H04B 7/0626; H04B 7/024; H04W 84/12; H04L 5/0023; H04L 5/0048; H04L 5/0053; H04L 5/0062
See application file for complete search history.

(56) References Cited

U.S. PATENT DOCUMENTS

2018/0109298 A1\* 4/2018 Elsherif ............... H04L 5/0048
2020/0336176 A1\* 10/2020 Seok ..................... H04L 5/0023

\* cited by examiner

*Primary Examiner* — Fred A Casca
(74) *Attorney, Agent, or Firm* — Schwegman Lundberg & Woessner, P.A.

(57) ABSTRACT

An access point (AP) may operate as a master AP (AP1) to perform multi-AP coordinated beamforming (CBF). The AP1 may to initiate a first sounding sequence with one or more STAs associated with the AP1 (BSS STAs) and the one or more STAs associated with a second AP (AP2) (OBSS STAs). In these embodiments, initiation of the first sounding sequence triggers the AP2 to join the sounding sequence to initiate a second sound sequence with the BSS STAs and the OBSS STAs.

19 Claims, 2 Drawing Sheets

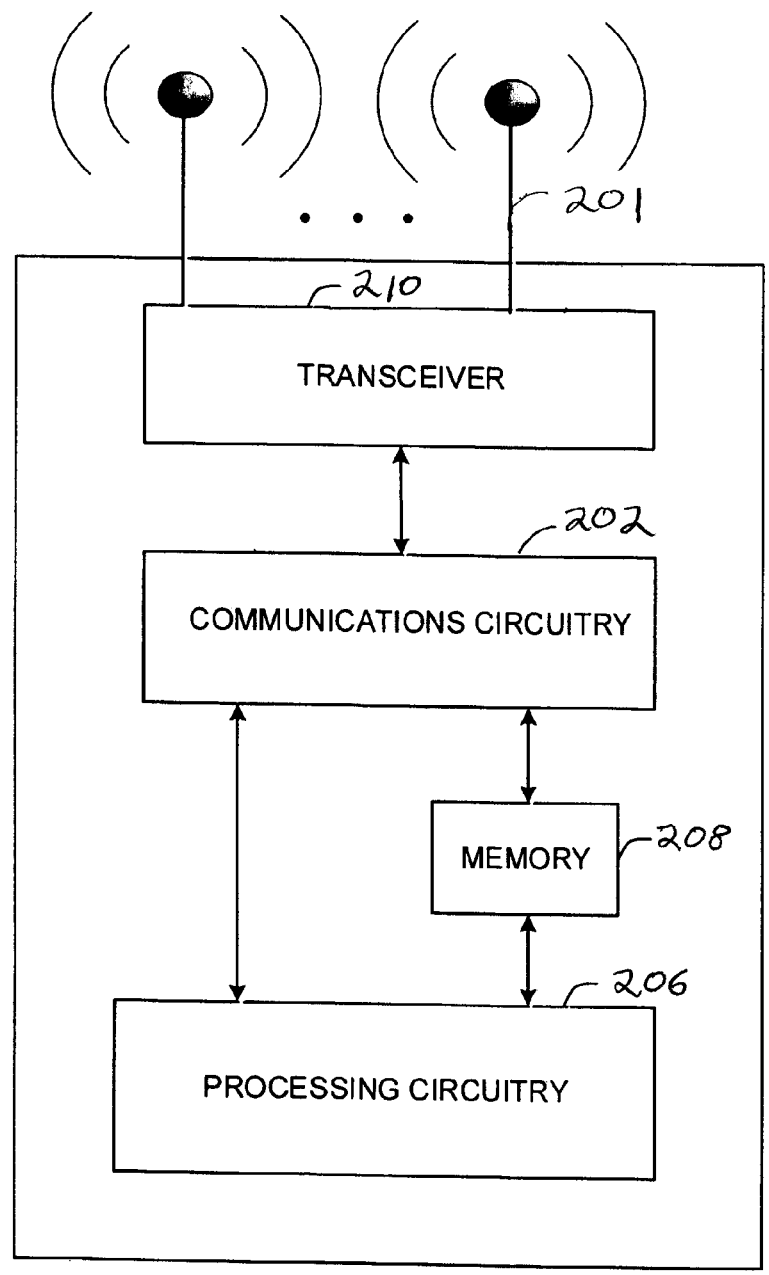

MULTI-AP COORDINATED BEAMFORMING (CBF) FOR EXTREMELY HIGH THROUGHPUT (EHT)

PRIORITY CLAIMS

This application claims priority under 35 USC 119 to the following U.S. Provisional Patent Applications: Ser. No. 62/847,215, filed May 13, 2019 entitled "MECHANISM TO SIGNAL MULTI USER RESOURCE ALLOCATION IN EHT", Ser. No. 62/866,112, filed Jun. 25, 2019 entitled "SYNCHRONIZATION FOR MULTI-AP JOINT TRANSMISSION", and Ser. No. 62/895,883, filed Sep. 4, 2019 entitled "MULTI-ACCESS POINT CHANNEL SOUNDING", each of which is incorporated herein by reference in its entirety.

TECHNICAL FIELD

Embodiments pertain to wireless communications. Some embodiments relate wireless local area networks (WLANs) that operate in accordance with the IEEE 802.11 standards. Some embodiments relate to IEEE 802.11be Extremely High Throughput (EHT) (i.e., the IEEE P802.11-Task Group BE EHT) (Wi-Fi 7).

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation. Beamforming is becoming increasingly important to help achieve higher throughput levels. Thus, what is needed are improved beamforming techniques.

BRIEF DESCRIPTION OF THE DRAWINGS

FIG. 2 illustrates a functional diagram of an exemplary communication station that may be suitable for use as an access point in accordance with some embodiments.

DETAILED DESCRIPTION

Figure 1:
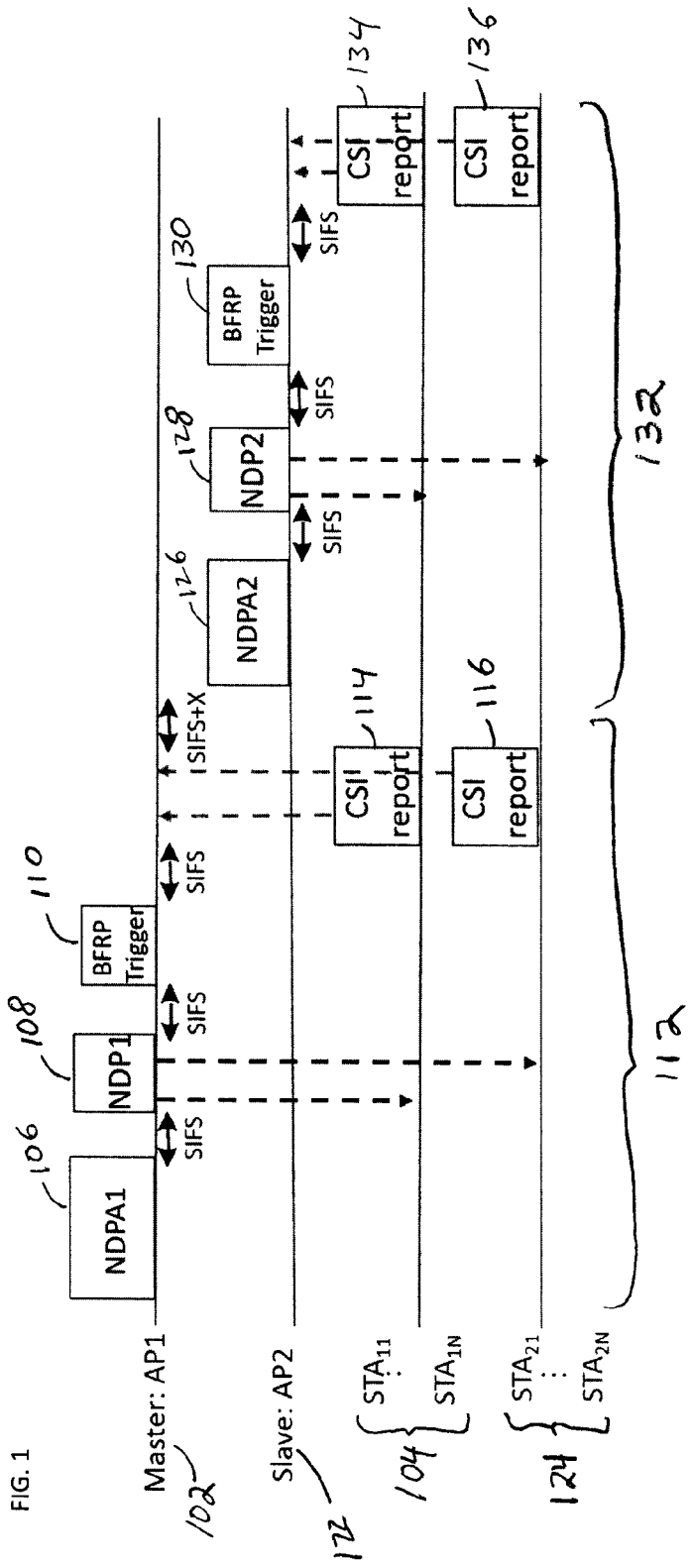
FIG. 1 illustrates a sequential sounding sequence for multi-access point (AP) coordinated beamforming (CBF) in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

FIG. 1 illustrates a sequential sounding sequence for multi-access point (AP) coordinated beamforming (CBF) in accordance with some embodiments. In accordance with some embodiments, an access point (AP) may operate as a master AP (AP1 102) to perform multi-AP coordinated beamforming (CBF). In these embodiments, to perform the multi-AP CBF, the AP1 102 may be configured to initiate a first sounding sequence with one or more STAs (BSS STAs 104) ($STA_{11}$-$STA_{1N}$) associated with the AP1 102 and the one or more STAs (OBSS STAs 124) ($STA_{21}$-$STA_{2N}$) associated with a second AP (AP2 122). In these embodiments, initiation of the first sounding sequence triggers the AP2 122 to join the sounding sequence to initiate a second sound sequence with the BSS STAs 104 and the OBSS STAs 124.

In these embodiments, the AP1 102 may decode first CSI reports sent from the BSS STAs 104 to the AP1 102 during the first sound sequence for use in determining direct channel information between the BSS STAs 104 and the AP1 102. The AP1 102 may decode first CSI reports sent from the OBSS STAs 124 to the AP1 102 during the first sounding sequence for use in determining interfering channel information between the OBSS STAs 124 and the AP1 102. These embodiments are described in more detail below.

In some embodiments, an apparatus of an access point (AP) of a basic service set (BSS) comprising processing circuitry and memory is disclosed herein. The processing circuitry may configure to AP to operate as a master AP (AP1 102) to perform multi-AP coordinated beamforming (CBF). To perform the multi-AP CBF, the processing circuitry may encode a first null data packet (NDP) announcement frame (NDPA1 106) for transmission. The NDPA1 106 may initiate a first sounding sequence. The NDPA1 106 may be encoded to include an identity (ID) of a second AP (AP2 122) (i.e., an overlapping BSS (OBSS)), identities of one or more STAs (BSS STAs 104) (i.e., $STA_{11}$-$STA_{1N}$) associated with the AP1 102 and identities of one or more STAs (OBSS STAs 124) (i.e., $STA_{21}$-$STA_{2N}$) associated with the AP2 122. The NDPA1 106 may be encoded to include a channel state information (CSI) format field in a user information field for each of the STAs. The CSI format field may indicate a CSI feedback type.

In these embodiments, the processing circuitry may encode a first NDP (NDP1 108) for transmission a short-interframe spacing (SIFS) after the NDPA1 106. The NDP1 108 may be used by the STAs for preparing a CSI report. In these embodiments, the processing circuitry may encode a first beam-forming refinement phase (BFRP) trigger frame 110 (e.g., a CSI report trigger frame) for transmission a SIFS after the NDP1 108. The first BFRP trigger frame 110 may solicit (i.e., trigger each STA to send) a first CSI report 114 from the BSS STAs 104 and to solicit a first CSI report 116 from the OBSS STAs 124. The first BFRP trigger frame 110 may allocate resource units to the BSS STAs 104 and the OBSS STAs 124. In these embodiments, the processing circuitry may decode the first CSI reports 114, 116 received simultaneously/concurrently from the BSS STAs 104 and the OBSS STAs 124, the first CSI reports received in an trigger based (TB) PPDU sent from the BSS STAs 104 and the OBSS STAs 124 an SIFS after transmission of the first BFRP trigger frame 110. The TB PPDUs may be sent by the BSS STAs 104 and the OBSS STAs 124 in response to the first BFRP trigger frame 110 and are received on the allocated resource units.

The inclusion of the identity of the AP2 122 in the NDPA1 106 indicates to the AP2 122 to join the first sounding sequence initiated by the AP1 102 by transmission of an NDPA2 126 to initiate a second sounding sequence, an NDP2 128, and a second BFRP trigger frame 130, at least a SIFS (SIFS+x) after receipt of the first CSI reports. The second BFRP trigger frame 130 may trigger second CSI reports 134 from the BSS STAs 104 and second CSI reports 136 from the OBSS STAs 124 to the AP2 122.

In these embodiments, the processing circuitry of the AP1 102 may act like a sniffer and decode the second CSI reports sent from the BSS STAs 104 to the AP2 122 for use in determining interfering channel information between the BSS STAs 104 and the AP2 122 for beamforming. Similarly, the processing circuitry of the AP2 122 may act like a sniffer and decode the first CSI reports sent from the OBSS STAs 124 to the AP1 102 for use in determining interfering channel information between the OBSS STAs 124 and the AP1 102.

Although FIG. 1 illustrates the first sounding sequence and the second sounding sequence including a single 1 BFRP trigger frame—CSI report pair, this is not a requirement as in some embodiments, the first sounding sequence and the second sounding sequence may include additional BFRP trigger frame—CSI report pairs. In these embodiments, NDPA1 106 and NDP1 108 may be followed by a first BFRP trigger frame 110—CSI report pair and one or more second BFRP trigger frame 130—CSI report pairs, and NDPA2 126 and NDP2 128 may be followed by a first BFRP trigger frame 110—CSI report pair and one or more second BFRP trigger frame 130.

In some embodiments, the processing circuitry of AP1 102 may generate a beamformed data frame for transmission to the BSS STAs 104 based on the first CSI reports sent by the BSS STAs 104 to the AP1 102 and based on the first CSI reports sent by the OBSS STAs 124 to the AP1 102. The first CSI reports sent by the BSS STAs 104 to the AP1 102 comprise direct channel information and the first CSI reports sent by the OBSS STAs 124 to the AP1 102 comprise interfering channel information. Similarly, the processing circuitry of AP2 122 may generate a beamformed data frame for transmission to the OBSS STAs 124 based on the second CSI reports sent by the BSS STAs 104 to the AP2 122 and based on the second CSI reports sent by the OBSS STAs 124 to the AP2 122.

The second first CSI reports sent by the BSS STAs 104 to the AP2 122 comprise interfering channel information and the second CSI reports sent by the OBSS STAs 124 to the AP2 122 comprise direct channel information. In some embodiments, the use information field of the NDPA1 106 is encoded to include an association identity (AID) of the BSS and OBSS STAs 124. For the STAs from different BSS (OBSS STAs 124), the BSSID or BSS color is included for differentiation.

In some embodiments, the CSI format field is encoded to include CSI format info including the CSI feedback type (e.g., explicit or implicit), a number of bits for quantization of CSI, and a number of columns for CSI feedback and a frequency segment for CSI feedback. In some embodiments, the processing circuitry of the AP1 102 may multiplex different antenna or spatial streams of the NDP1 108 using a P-matrix or by an allocation of different tone sets.

In some embodiments, the processing circuitry may use a BSS color, a BSSID or other AP IDs for the multi-AP channel sounding to prevent the OBSS STAs 124 from discarding packets from AP1 102 (BSS), and prevent BSS STAs 104 from discarding packets from AP2 122 (OBSS). In these embodiments, before performing the multi-AP channel sounding, a procedure between APs may allocate identifications to each AP, for example, BSS color or other AP ID. Upon completion of this procedure, each AP will announce the AP identities to its own BSS, such that when the BSS STA receives a packet from OBSS AP and if this OBSS AP's ID is identified by the STA, the STA should not discard the packet.

In some embodiments, a physical layer protocol data unit may be a physical layer conformance procedure (PLCP) protocol data unit (PPDU). In some embodiments, the AP and client devices may communicate in accordance with one of the IEEE 802.11 standards. IEEE draft specification IEEE P802.11ax/D4.0, February 2019 is incorporated herein by reference in its entirety.

FIG. 2 illustrates a functional diagram of an exemplary communication station that may be suitable for use as an access point in accordance with some embodiments. The communication station 200 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 200 may include communications circuitry 202 and a transceiver 210 for transmitting and receiving signals to and from other communication stations using one or more antennas 201. The communications circuitry 202 may include circuitry that can operate the physical layer (PHY) communications and/or medium access control (MAC) communications for controlling access to the wireless medium, and/or any other communications layers for transmitting and receiving signals. The communication station 200 may also include processing circuitry 206 and memory 208 arranged to perform the operations described herein. In some embodiments, the communications circuitry 202 and the processing circuitry 206 may be configured to perform operations detailed in the above figures, diagrams, and flows.

In accordance with some embodiments, the communications circuitry 202 may be arranged to contend for a wireless medium and configure frames or packets for communicating over the wireless medium. The communications circuitry 202 may be arranged to transmit and receive signals. The communications circuitry 202 may also include circuitry for modulation/demodulation, upconversion/downconversion, filtering, amplification, etc. In some embodiments, the processing circuitry 206 of the communication station 200 may include one or more processors. In other embodiments, two or more antennas 201 may be coupled to the communications circuitry 202 arranged for sending and receiving signals. The memory 208 may store information for configuring the processing circuitry 206 to perform operations for configuring and transmitting message frames and performing the various operations described herein. The memory 208 may include any type of memory, including non-transitory memory, for storing information in a form readable by a machine (e.g., a computer). For example, the memory 208 may include a computer-readable storage device, read-only memory (ROM), random-access memory (RAM), magnetic disk storage media, optical storage media, flash-memory devices and other storage devices and media.

In some embodiments, the communication station 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 200 may include one or more antennas 201. The antennas 201 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 200 may include one or more of a keyboard, a display, a non-volatile memory port, multiple antennas, a graphics processor, an application processor, speakers, and other mobile device elements. The display may be an LCD screen including a touch screen.

Although the communication station 200 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 200 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 200 may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP), the apparatus comprising:
    processing circuitry; and memory, wherein the processing circuitry configures the AP to operate as a master AP (AP1) to perform multi-AP coordinated beamforming (CBF),
    wherein to perform the multi-AP CBF, the processing circuitry is configured to:
    encode a first null data packet (NDP) announcement frame (NDPA1) for transmission, the NDPA1 to initiate a first sounding sequence, the NDPA1 encoded to include an identity (ID) of a second AP (AP2) of an overlapping basic service set (OBSS), identities of one or more basic service set stations (BSS STAs) associated with the AP1 and identities of one or more OBSS STAs associated with the AP2,
    wherein the NDPA1 is encoded to include a channel state information (CSI) format field in a user information field for each of the BSS STAs and the OBSS STAs, the CSI format field indicating a CSI feedback type,
    encode a first NDP (NDP1) for transmission a short-interframe spacing (SIFS) after the NDPA1, the NDP1 to be used by the BSS STAs and the OBSS STAs for preparing a CSI report;
    encode a first beam-forming refinement phase (BFRP) trigger frame for transmission a SIFS after the NDP1, the first BFRP trigger frame to solicit a first CSI report from the BSS STAs and to solicit a first CSI report from the OBSS STAs, the first BFRP trigger frame to allocate resource units to the BSS STAs and the OBSS STAs;
    decode the first CSI reports received concurrently from the BSS STAs and the OBSS STAs, the first CSI reports received in a trigger based (TB) physical layer conformance procedure (PLCP) protocol data unit (PPDU) sent from the BSS STAs and the OBSS STAs an SIFS after transmission of the first BFRP trigger frame, the TB PPDUs sent by the BSS STAs and the OBSS STAs in response to the first BFRP trigger frame and are received on the allocated resource units,
    wherein inclusion of the identity of the AP2 in the NDPA1 indicates to the AP2 to join the first sounding sequence initiated by the AP1 by transmission of an NDPA2 to initiate a second sounding sequence, an NDP2, and a second BFRP trigger frame, at least a SIFS after receipt of the first CSI reports, the second BFRP trigger frame to trigger second CSI reports from the BSS STAs and the OBSS STAs to the AP2, and
    wherein the processing circuitry is configured to decode the second CSI reports sent from the BSS STAs to the AP2 for use in determining interfering channel information between the BSS STAs and the AP2 for beamforming.

2. The apparatus of claim 1, wherein the processing circuitry is configured to generate a beamformed data frame for transmission to the BSS STAs based on the first CSI reports sent by the BSS STAs to the AP1 and based on the first CSI reports sent by the OBSS STAs to the AP1,
    wherein the first CSI reports sent by the BSS STAs to the AP1 comprise direct channel information and the first CSI reports sent by the OBSS STAs to the AP1 comprise interfering channel information.

3. The apparatus of claim 2, wherein the use information field of the NDPA1 is encoded to include an association identity (AID) of the BSS STAs and the OBSS STAs, wherein for the OBSS STAs, a BSS identifier (BSSID) or BSS color is included for differentiation.

4. The apparatus of claim 2, wherein the CSI format field is encoded to include CSI format info including the CSI feedback type, a number of bits for quantization of CSI, and a number of columns for CSI feedback and a frequency segment for CSI feedback.

5. The apparatus of claim 2, wherein the processing circuitry is configured to multiplex different spatial streams of the NDP1 using a P-matrix or by an allocation of different tone sets.

6. The apparatus of claim 2, wherein the processing circuitry is configured to use a BSS color, a BSS identifier (BSSID) or other AP IDs for the multi-AP channel sounding to prevent the OBSS STAs from discarding packets from the AP1 and prevent the BSS STAs from discarding packets from the AP2.

7. The apparatus of claim 1, wherein the memory is configured to store the first CSI reports.

8. The apparatus of claim 7 wherein the processing circuitry comprises a baseband processor.

9. The apparatus of claim 8 wherein the baseband processor is configured to decode the first CSI reports received through two or more antennas of the AP1.

10. The apparatus of claim 1, wherein the processing circuitry configures the AP1 to operate in accordance with an IEEE 802.11 communication technique.

11. An apparatus of an access point (AP), the apparatus comprising:
processing circuitry; and memory, wherein the processing circuitry configures the AP to operate as a master AP (AP1) to perform multi-AP coordinated beamforming (CBF),
wherein to perform the multi-AP CBF, the processing circuitry is configured to:
initiate a first sounding sequence with one or more basic service set stations (BSS STAs) associated with the AP1 and the one or more overlapping basic service set STAs (OBSS STAs) associated with a second AP (AP2) of an OBSS,
wherein initiation of the first sounding sequence triggers the AP2 to join the sounding sequence to initiate a second sound sequence with the BSS STAs and the OBSS STAs,
wherein the processing circuitry is configured to:
decode first channel state information (CSI) reports sent from the BSS STAs to the AP1 during the first sound sequence for use in determining direct channel information between the BSS STAs and the AP1;
decode first CSI reports sent from the OBSS STAs to the AP1 during the first sounding sequence for use in determining interfering channel information between the OBSS STAs and the AP1; and
encode a first null data packet (NDP) announcement frame (NDPA1) for transmission, the NDPA1 to initiate the first sounding sequence, the NDPA1 encoded to include an identity (ID) of the AP2, identities of the one or more BSS STAs associated with the AP1 and identities of the one or more OBSS STAs associated with the AP2,
wherein the NDPA1 is encoded to include a channel state information (CSI) format field in a user information field for each of the BSS STAs and the OBSS STAs, the CSI format field indicating a CSI feedback type,
encode a first NDP (NDP1) for transmission a short-interframe spacing (SIFS) after the NDPA1, the NDP1 to be used by the BSS STAs and the OBSS STAs for preparing a CSI report;
encode a first beam-forming refinement phase (BFRP) trigger frame for transmission a SIFS after the NDP1, the first BFRP trigger frame to solicit the first CSI report from the BSS STAs and to solicit the first CSI report from the OBSS STAs, the first BFRP trigger frame to allocate resource units to the BSS STAs and the OBSS STAs;
decode the first CSI reports received from the BSS STAs and the OBSS STAs, the first CSI reports received in a trigger based (TB) physical layer conformance procedure (PLCP) protocol data unit (PPDU) sent from the BSS STAs and the OBSS STAs an SIFS after transmission of the first BFRP trigger frame, the TB PPDUs sent by the BSS STAs and the OBSS STAs in response to the first BFRP trigger frame and are received on the allocated resource units.

12. The apparatus of claim 11, wherein inclusion of the identity of the AP2 in the NDPA1 indicates to the AP2 to join the first sounding sequence initiated by the AP1 by transmission of an NDPA2 to initiate a second sounding sequence, an NDP2, and a second BFRP trigger frame, at least a SIFS after receipt of the first CSI reports, the second BFRP trigger frame to trigger second CSI reports from the BSS STAs and the OBSS STAs to the AP2, and
wherein the processing circuitry is configured to act like a sniffer and decode the second CSI reports sent from the BSS STAs to the AP2 for use in determining interfering channel information between the BSS STAs and the AP2 for beamforming.

13. The apparatus of claim 12 wherein the processing circuitry is configured to generate a beamformed data frame for transmission to the BSS STAs based on the first CSI reports sent by the BSS STAs to the AP1 and based on the first CSI reports sent by the OBSS STAs to the AP1,
wherein the first CSI reports sent by the BSS STAs to the AP1 comprise direct channel information and the first CSI reports sent by the OBSS STAs to the AP1 comprise interfering channel information.

14. A non-transitory computer-readable storage medium that stores instructions for execution by processing circuitry of an access point (AP), wherein the instructions configure the processing circuitry to configure to AP to operate as a master AP (AP1) to perform multi-AP coordinated beamforming (CBF),
wherein to perform the multi-AP CBF, the processing circuitry is configured to:
encode a first null data packet (NDP) announcement frame (NDPA1) for transmission, the NDPA1 to initiate a first sounding sequence, the NDPA1 encoded to include an identity (ID) of a second AP (AP2) of an overlapping basic service set (OBSS), identities of one or more basic service set stations (BSS STAs) associated with the AP1 and identities of one or more OBSS STAs associated with the AP2,
wherein the NDPA1 is encoded to include a channel state information (CSI) format field in a user information field for each of the BSS STAs and the OBSS STAs, the CSI format field indicating a CSI feedback type,
encode a first NDP (NDP1) for transmission a short-interframe spacing (SIFS) after the NDPA1, the NDP1 to be used by the BSS STAs and the OBSS STAs for preparing a CSI report;
encode a first beam-forming refinement phase (BFRP) trigger frame for transmission a SIFS after the NDP1, the first BFRP trigger frame to solicit a first CSI report from the BSS STAs and to solicit a first CSI report from the OBSS STAs, the first BFRP trigger frame to allocate resource units to the BSS STAs and the OBSS STAs;
decode the first CSI reports received from the BSS STAs and the OBSS STAs, the first CSI reports received in a trigger based (TB) physical layer conformance procedure (PLCP) protocol data unit (PPDU) sent from the BSS STAs and the OBSS STAs an SIFS after transmission of the first BFRP trigger frame, the TB PPDUs sent by the BSS STAs and the OBSS STAs in response to the first BFRP trigger frame and are received on the allocated resource units,
wherein inclusion of the identity of the AP2 in the NDPA1 indicates to the AP2 to join the first sounding sequence initiated by the AP1 by transmission of an NDPA2 to initiate a second sounding sequence, an NDP2, and a second BFRP trigger frame, at least a SIFS after receipt of the first CSI reports, the second BFRP trigger frame to trigger second CSI reports from the BSS STAs and the OB SS STAs to the AP2, and wherein the processing circuitry is configured to decode the second CSI reports sent from the BSS STAs to the AP2 for use in determining interfering channel information between the BSS STAs and the AP2 for beamforming.

15. The non-transitory computer-readable storage medium of claim 14, wherein the processing circuitry is configured to generate a beamformed data frame for transmission to the BSS STAs based on the first CSI reports sent by the BSS STAs to the AP1 and based on the first CSI reports sent by the OBSS STAs to the AP1, wherein the first CSI reports sent by the BSS STAs to the AP1 comprise direct channel information and the first CSI reports sent by the OBSS STAs to the AP1 comprise interfering channel information.

16. The non-transitory computer-readable storage medium of claim 15, wherein the use information field of the NDPA1 is encoded to include an association identity (AID) of the BSS STAs and the OB SS STAs, wherein for the OBSS STAs, a BSS identifier (BSSID) or BSS color is included for differentiation.

17. The non-transitory computer-readable storage medium of claim 16, wherein the CSI format field is encoded to include CSI format info including the CSI feedback type, a number of bits for quantization of CSI, and a number of columns for CSI feedback and a frequency segment for CSI feedback.

18. The non-transitory computer-readable storage medium of claim 17, wherein the processing circuitry is configured to multiplex different spatial streams of the NDP1 using a P-matrix or by an allocation of different tone sets.

19. The on-transitory computer-readable storage medium of claim 18, wherein the processing circuity is configured to use a BSS color, a BSSID or other AP IDs for the multi-AP channel sounding to prevent the OBSS STAs from discarding packets from AP1 and prevent the BSS STAs from discarding packets from AP2.

* * * * *

UNITED STATES PATENT AND TRADEMARK OFFICE
CERTIFICATE OF CORRECTION

PATENT NO. : 11,621,753 B2
APPLICATION NO. : 15/930885
DATED : April 4, 2023
INVENTOR(S) : Jiang et al.

Page 1 of 1

It is certified that error appears in the above-identified patent and that said Letters Patent is hereby corrected as shown below:

In the Claims

In Column 6, Line 63, in Claim 6, delete "circuity" and insert --circuitry-- therefor In Column 9, Line 3, in Claim 14, delete "OB SS" and insert --OBSS-- therefor In Column 10, Line 1, in Claim 16, delete "OB SS" and insert --OBSS-- therefor In Column 10, Line 15, in Claim 16, delete "on-transitory" and insert --non-transitory-- therefor In Column 10, Line 16, in Claim 19, delete "circuity" and insert --circuitry-- therefor Signed and Sealed this
Thirtieth Day of July, 2024

Katherine Kelly Vidal
*Director of the United States Patent and Trademark Office*